(12) United States Patent
She et al.

(10) Patent No.: US 11,927,800 B2
(45) Date of Patent: Mar. 12, 2024

(54) ELECTRONICALLY CONTROLLED DEPOLARIZER BASED ON CROSSED-SLIT WAVEGUIDE

(71) Applicant: Zhejiang University, Zhejiang (CN)

(72) Inventors: Xuan She, Zhejiang (CN); Junjie Yao, Zhejiang (CN); Kan Chen, Zhejiang (CN); Tengchao Huang, Zhejiang (CN); Xiaowu Shu, Zhejiang (CN)

(73) Assignee: ZHEJIANG UNIVERSITY, Zhejiang (CN)

(*) Notice: Subject to any disclaimer, the term of this patent is extended or adjusted under 35 U.S.C. 154(b) by 274 days.

(21) Appl. No.: 17/616,696

(22) PCT Filed: Apr. 22, 2020

(86) PCT No.: PCT/CN2020/086130
§ 371 (c)(1),
(2) Date: Dec. 6, 2021

(87) PCT Pub. No.: WO2020/244322
PCT Pub. Date: Dec. 10, 2020

(65) Prior Publication Data
US 2022/0308287 A1 Sep. 29, 2022

(30) Foreign Application Priority Data

Jun. 6, 2019 (CN) .......................... 201910491850.9

(51) Int. Cl.
*G02B 6/126* (2006.01)
*G02F 1/035* (2006.01)

(52) U.S. Cl.
CPC ............. *G02B 6/126* (2013.01); *G02F 1/035* (2013.01)

(58) Field of Classification Search
CPC ..... G02B 6/126; G02B 6/2726; G02B 6/2786; G02B 2006/1204; G02B 6/125; G02F 1/035
See application file for complete search history.

(56) References Cited

U.S. PATENT DOCUMENTS 10,302,866 B2 * 5/2019 Lin .......................... G02B 6/126
10,444,430 B2 * 10/2019 Uchida .................. G02B 6/126

* cited by examiner

*Primary Examiner* — John Bedtelyon

(57) ABSTRACT

An electrically controlled depolarizer based on a crossed-slit waveguide (3) includes a horizontal-slit waveguide (1), a 45-degree polarization rotation waveguide (2), a pair of modulation electrodes (4) and the crossed-slit waveguide (3). Broad-spectrum TM (transverse magnetic) polarized light is inputted from one end of the horizontal-slit waveguide (1), and then a part of the broad-spectrum TM polarized light is converted into broad-spectrum TE (transverse electric) polarized light through the 45-degree polarization rotation waveguide (2), and then the broad-spectrum TE polarized light and the remaining broad-spectrum TM polarized light enter an input end of the crossed-slit waveguide (3); the board-spectrum TE polarized light is transmitted in a vertical slit of the crossed-slit waveguide (3); the remaining broad-spectrum TM polarized light is transmitted in a horizontal slit of the crossed-slit waveguide (3); and the broad-spectrum TE polarized light and the remaining broad-spectrum TM polarized light form depolarized light at an output end of the crossed-slit waveguide (3). The pair of modulation electrodes (4) realize the precise adjustment of the rotation angle of the 45-degree polarization rotation waveguide (2) by electronic control, such that the TE polarized light and the TM polarized light at the output end of the crossed-slit waveguide (3) have equal energy, thereby overcoming uneven light splitting caused by loss of the polarization rotation waveguide and TE and TM waveguide transmission loss.

6 Claims, 2 Drawing Sheets

ELECTRONICALLY CONTROLLED DEPOLARIZER BASED ON CROSSED-SLIT WAVEGUIDE

BACKGROUND OF THE PRESENT INVENTION

Field of Invention

The present invention relates to the integrated optical field, and more particularly to an electronically controlled depolarizer based on a crossed-slit waveguide.

Description of Related Arts

The depolarizer is a passive polarization device which is able to convert polarized light into unpolarized light. It is used in fiber-optic gyroscopes, fiber sensors, high-precision spectrophotometers, photoelectric detectors, and Raman amplifiers. According to the implementation method, the depolarizer is able to be divided into electro-optical type depolarizer, sound-controlled type depolarizer and Lyot type depolarizer, wherein the Lyot type depolarizer is suitable for wide-spectrum light sources, is simple and practical, and is a widely used depolarizer. The Lyot type fiber depolarizer includes two high-birefringence polarization maintaining fibers with a length ratio of 1:2 and a birefringent main axis angle of 45°. Its working principle is to use the time delay characteristic of the light transmitted along two main axes of the polarization maintaining fibers to pull two polarization eigenstates of the polarized light away from time, so that the degree of coherence of the emitted light is zero. In addition, through the 45° angle between the two main axes of the two high-birefringence polarization maintaining fibers, the light energy is equally split in the two orthogonal polarization directions, and finally the input light is depolarized. The birefringence of the optical fiber is only about $5 \times 10^{-4}$, so in some applications, several meters or tens of meters of fiber are required to meet the needs of the system for depolarization. Moreover, it is difficult to guarantee precise 45-degree fusion splice. The fusion splice is relatively fragile and susceptible to stress, which limits the fiber-type Lyot depolarizer.

Slit waveguides were proposed by Lipson group, Cornell University in 2004. It is found that when a distance between two adjacent silicon waveguides with a small width is close to nanometer-scale, the optical field is strongly confined to a slit with low refractive index therebetween. According to different polarization directions, the slit waveguide is divided into vertical-slit waveguide and horizontal-slit waveguide. The common feature of the two slit waveguides is that they have excellent local characteristics only in their own polarization direction, respectively, that is to say, each type of slit waveguide only has excellent local characteristics for one of TE (transverse electric) polarization mode and TM (transverse magnetic) polarization mode. The crossed-slit waveguide has two orthogonal slits in the horizontal and vertical directions, respectively, which is able to transmit both the TE polarization mode and TM polarization mode with high strength and high local area at the same time. There is no direct energy in the two orthogonal polarization mode, which are independent from each other. The above feature of the crossed-slit waveguide provides favorable conditions for the development of miniaturized waveguide depolarizers.

SUMMARY OF THE PRESENT INVENTION

In order to solve the problems in the background art, the present invention provides an electronically controlled depolarizer based on a crossed-slit waveguide with high integration, small size, simple preparation process, and easy packaging.

The present invention adopts technical solutions as follows.

An electronically controlled depolarizer based on a crossed-slit waveguide comprises a horizontal-slit waveguide, a 45-degree polarization rotation waveguide, a crossed-slit waveguide and a pair of modulation electrodes, wherein an output end of the horizontal-slit waveguide is connected with an input end of the crossed-slit waveguide through the 45-degree polarization rotation waveguide, the pair of modulation electrodes are located at two sides of the 45-degree polarization rotation waveguide, respectively.

The horizontal-slit waveguide, the 45-degree polarization rotation waveguide and the crossed-slit waveguide are integrated on an upper surface of a basal layer which is formed by a silicon substrate and a first silica buffer layer along light transmission direction; the first silica buffer layer is located on the silicon substrate; each of the horizontal-slit waveguide, the 45-degree polarization rotation waveguide and the crossed-slit waveguide comprises a first lithium niobate single crystal thin film layer, a second silica buffer layer and a second lithium niobate single crystal thin film layer from bottom to top in sequence.

Each of the 45-degree polarization rotation waveguide and the crossed-slit waveguide has a vertical slit which penetrates through the first lithium niobate single crystal thin film layer, the second silica buffer layer and the second lithium niobate single crystal thin film layer, and is filled with air; the vertical slit which is provided in the 45-degree polarization rotation waveguide is formed by extending from a side edge of an input end of the 45-degree polarization rotation waveguide to a middle portion of an output end thereof; a small angle is formed between the vertical slit which is provided in the 45-degree polarization rotation waveguide and the light transmission direction; the vertical slit which is provided in the crossed-slit waveguide is formed by extending from a middle portion of an input end of the crossed-slit waveguide to a middle portion of an output end thereof.

Broad-spectrum TM (transverse magnetic) polarized light is inputted to the 45-degree polarization rotation waveguide through the horizontal-slit waveguide, the 45-degree polarization rotation waveguide converts a half of the broad-spectrum TM polarized light into the broad-spectrum TE (transverse electric) polarized light; the broad-spectrum TE polarized light and the other half of the broad-spectrum TM polarized light, both of which are outputted from the 45-degree polarization rotation waveguide, enter an input end of the crossed-slit waveguide, the broad-spectrum TE polarized light is transmitted in the vertical slit of the crossed-slit waveguide, and the other half of the broad-spectrum TM polarized light is transmitted in a horizontal slit of the crossed-slit waveguide; the broad-spectrum TE polarized light and the other half of the broad-spectrum TM polarized light form depolarized light at an output end of the crossed-slit waveguide.

The second silica buffer layer comprises a horizontal slit provided in the crossed-slit waveguide and a horizontal slit provided in the horizontal-slit waveguide. Since a refractive index of the second silica buffer layer is smaller than that of the first lithium niobate single crystal thin film layer and the second lithium niobate single crystal thin film layer, the second silica buffer layer serves as a core layer of the crossed-slit waveguide and the horizontal-slit waveguide for light transmission.

A transmission medium of the broad-spectrum TE polarized light in the vertical slit of the crossed-slit waveguide is air; a transmission medium of the broad-spectrum TM polarized light in the horizontal slit of the crossed-slit waveguide is silica.

An optical path difference between the TE polarized light and the TM polarized light in the crossed-slit waveguide is greater than a coherence length of the broad-spectrum TM polarized light which is inputted to the horizontal-slit waveguide.

Through electronic control, the pair of modulation electrodes precisely adjust a rotation angle of the 45-degree polarization rotation waveguide, so that the broad-spectrum TE polarized light the and broad-spectrum TM polarized light both of which are outputted from the output end of the crossed-slit waveguide are equal in energy.

The horizontal-slit waveguide only supports TM mode optical transmission; the crossed-slit waveguide is able to support both TE mode optical transmission and TM mode optical transmission.

The present invention has some beneficial effects as follows.

(1) The electronically controlled depolarizer provided by the present invention is based on a crossed-slit waveguide. TE polarized light is transmitted in the vertical slit of the crossed-slit waveguide, and the transmission medium is air. TM polarized light is transmitted in the horizontal slit of the crossed-slit waveguide, and the transmission medium is silica. Due to the refractive index difference between silica and air is 0.5 or more, and the birefringence of the ordinary polarization fiber is only about 5×10', the optical path difference of 1 mm length is equivalent to about 1 m of common polarization fiber in Lyot depolarizer.

(2) There are a pair of modulation electrodes at two sides of the 45-degree polarization rotation waveguide of the electronically controlled depolarizer based on the crossed-slit waveguide provided by the present invention, so as to adjust the rotation angle and overcome uneven light splitting caused by loss of 45-degree polarization rotation waveguide, and transmission loss of TE and TM waveguide, which greatly reduces the requirement for loss caused by preparing the optical waveguide, so that the TE polarized light and the TM polarized light at the output end of the crossed-slit waveguide are equal in energy.

(3) The electronically controlled depolarizer provided by the present invention has high integrity, small size, simple preparation process, is easy to be packaged and suitable for mass production, and is able to be integrated with other optical chips.

Figure 1:
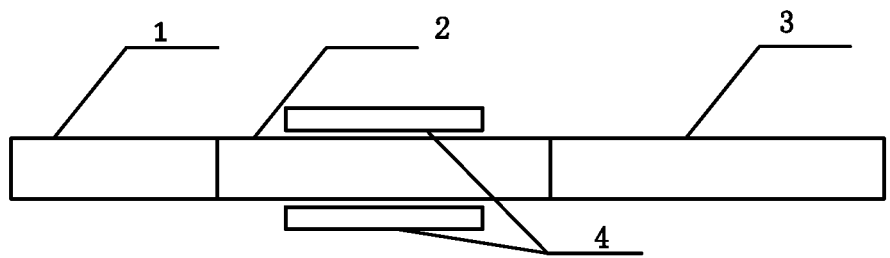
FIG. 1 is a structurally schematic view of an electronically controlled depolarizer based on a crossed-slit waveguide provided by the present invention.

In the drawings, 1: horizontal-slit waveguide; 2: 45-degree polarization rotation waveguide; 3: crossed-slit waveguide; 4: modulation electrode; 5: silicon substrate; 6: first silica buffer layer; 7: first lithium niobate single crystal thin film layer; 8: second silica buffer layer; 9: second lithium niobate single crystal thin film layer; 10: air.

DETAILED DESCRIPTION OF THE PREFERRED EMBODIMENT

The present invention is further explained with accompanying drawings and embodiments as follows.

Referring to FIG. 1, an electronically controlled depolarizer based on a crossed-slit waveguide provided by the present invention comprises a horizontal-slit waveguide 1, a 45-degree polarization rotation waveguide 2, a crossed-slit waveguide 3 and a pair of modulation electrodes 4, wherein an output end of the horizontal-slit waveguide 1 is connected with an input end of the crossed-slit waveguide 3 through the 45-degree polarization rotation waveguide 2, the pair of modulation electrodes 4 are located at two sides of the 45-degree polarization rotation waveguide 2, respectively.

Figure 2:
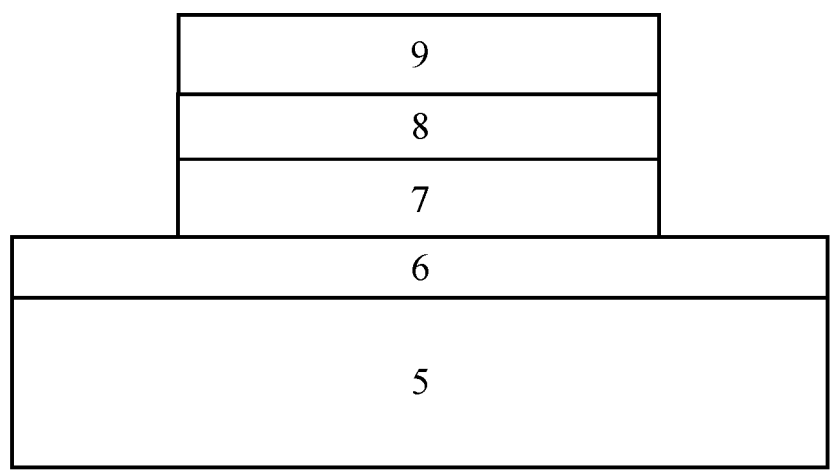
FIG. 2 is a cross-sectional schematic view of a horizontal-slit waveguide.
Figure 3:
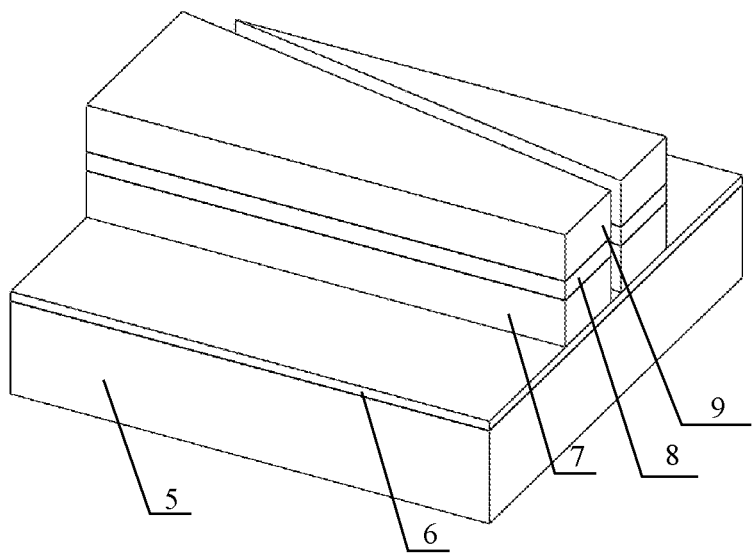
FIG. 3 is a structurally schematic view of a 45-degree polarization rotation waveguide.
Figure 4:
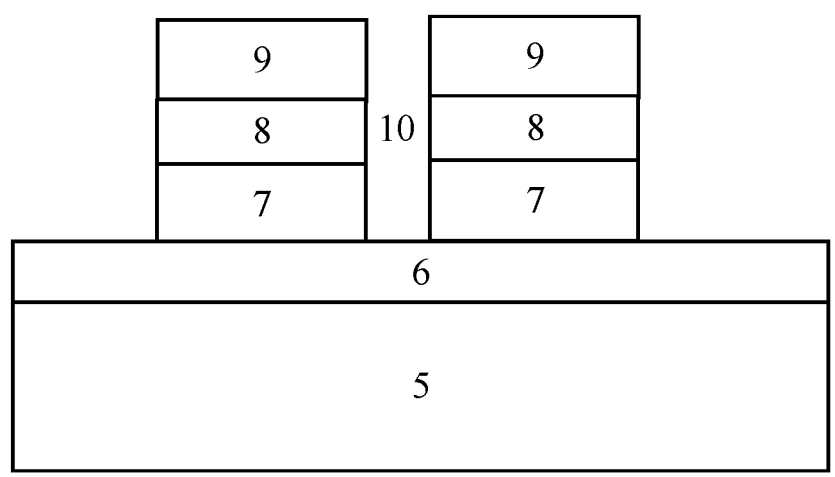
FIG. 4 is a cross-sectional schematic view of the crossed-slit waveguide.

Referring to FIGS. 2, 3 and 4, the horizontal-slit waveguide 1, the 45-degree polarization rotation waveguide 2 and the crossed-slit waveguide 3 are integrated on an upper surface of a basal layer which is formed by a silicon substrate and a first silica buffer layer along light transmission direction; the first silica buffer layer is located on the silicon substrate; each of the horizontal-slit waveguide 1, the 45-degree polarization rotation waveguide 2 and the crossed-slit waveguide 3 comprises a first lithium niobate single crystal thin film layer 7, a second silica buffer layer 8 and a second lithium niobate single crystal thin film layer 9 from bottom to top in sequence.

As shown in FIGS. 3 and 4, each of the 45-degree polarization rotation waveguide 2 and the crossed-slit waveguide 3 has a vertical slit which penetrates through the first lithium niobate single crystal thin film layer 7, the second silica buffer layer 8 and the second lithium niobate single crystal thin film layer 9, and is filled with air 10. The vertical slit which is provided in the 45-degree polarization rotation waveguide 2 is formed by extending from a side edge of an input end of the 45-degree polarization rotation waveguide 2 to a middle portion of an output end thereof. A small angle is formed between the vertical slit which is provided in the 45-degree polarization rotation waveguide 2 and the light transmission direction. The vertical slit which is provided in the crossed-slit waveguide 3 is formed by extending from a middle portion of an input end of the crossed-slit waveguide 3 to a middle portion of an output end thereof.

The optical path difference between the TE (transverse electric) mode and the TM (transverse magnetic) mode in the crossed-slit waveguide 3 is greater than a coherence length of the broad-spectrum light TM which is inputted to the horizontal-slit waveguide 1.

Through electronic control, the pair of modulation electrodes 4 precisely adjust a rotation angle of the 45-degree polarization rotation waveguide 2, so that the broad-spectrum TE polarized light the and broad-spectrum TM polarized light both of which are outputted from the output end of the crossed-slit waveguide 3 are equal in energy.

Embodiment

The broad-spectrum TM polarized light is inputted to the 45-degree polarization rotation waveguide 2 through the horizontal-slit waveguide 1, the 45-degree polarization rotation waveguide 2 converts a half of the broad-spectrum TM polarized light into the broad-spectrum TE polarized light; the broad-spectrum TE polarized light and the other half of the broad-spectrum TM polarized light, both of which are outputted from the 45-degree polarization rotation waveguide 2, enter an input end of the crossed-slit waveguide 3, the broad-spectrum TE polarized light is transmitted in the vertical slit of the crossed-slit waveguide 3, and the other half of the broad-spectrum TM polarized light is transmitted in the horizontal slit of the crossed-slit waveguide 3; the broad-spectrum TE polarized light and the other half of the broad-spectrum TM polarized light form depolarized light at an output end of the crossed-slit waveguide 3.

According to the preferred embodiment, the inputted broad-spectrum TM polarized light comes from an SLD (superluminescent diode) light source with an output power of 800 microwatts, a center wavelength of 1310 nanometers, and a 3 dB full width at half maximum of 40 nm. A coherence length of the light source is 42.9 µm. A thickness of the silicon substrate 5 is 0.5 mm, a thickness of the first silica buffer layer 6 is 2 µm, a thickness of the first lithium niobate single crystal thin film layer 7 is 2 µm, a thickness of the second silica buffer layer 8 is 0.2 µm, and a thickness of the second lithium niobate single crystal thin film layer 9 is 2 µm. A width of the vertical slit is 0.2 µm, a length of the pair of modulation electrodes 4 is 400 µm, and a distance between the pair of modulation electrodes 4 and the 45-degree polarization rotation waveguide 2 is 2 µm. A length of the horizontal-slit waveguide 1 is 100 µm, a length of the 45-degree polarization rotation waveguide 2 is 500 µm, and a length of the crossed-slit waveguide 3 is 400 µm. An optical path difference between the TE polarized light and the TM polarized light both of which are outputted at the output end of the crossed-slit waveguide 3 is about 200 µm, which is more than 3 times the coherence length of the SLD light source, thereby achieving depolarization.

What is claimed is:

1. An electronically controlled depolarizer based on a crossed-slit waveguide, the electronically controlled depolarizer comprising a horizontal-slit waveguide (1), a 45-degree polarization rotation waveguide (2), a crossed-slit waveguide (3) and a pair of modulation electrodes (4), wherein:
   an output end of the horizontal-slit waveguide (1) is connected with an input end of the crossed-slit waveguide (3) through the 45-degree polarization rotation waveguide (2), the pair of modulation electrodes (4) are located at two sides of the 45-degree polarization rotation waveguide (2), respectively;
   the horizontal-slit waveguide (1), the 45-degree polarization rotation waveguide (2) and the crossed-slit waveguide (3) are integrated on an upper surface of a basal layer which is formed by a silicon substrate (5) and a first silica buffer layer (6) along light transmission direction; the first silica buffer layer (6) is located on the silicon substrate (5); each of the horizontal-slit waveguide (1), the 45-degree polarization rotation waveguide (2) and the crossed-slit waveguide (3) comprises a first lithium niobate single crystal thin film layer (7), a second silica buffer layer (8) and a second lithium niobate single crystal thin film layer (9) from bottom to top in sequence;
   each of the 45-degree polarization rotation waveguide (2) and the crossed-slit waveguide (3) has a vertical slit which penetrates through the first lithium niobate single crystal thin film layer (7), the second silica buffer layer (8) and the second lithium niobate single crystal thin film layer (9), and is filled with air; the vertical slit which is provided in the 45-degree polarization rotation waveguide (2) is formed by extending from a side edge of an input end of the 45-degree polarization rotation waveguide (2) to a middle portion of an output end thereof; the vertical slit which is provided in the crossed-slit waveguide (3) is formed by extending from a middle portion of an input end of the crossed-slit waveguide (3) to a middle portion of an output end thereof.

2. The electronically controlled depolarizer based on the crossed-slit waveguide according to claim 1, wherein broad-spectrum TM (transverse magnetic) polarized light is inputted to the 45-degree polarization rotation waveguide (2) through the horizontal-slit waveguide (1), the 45-degree polarization rotation waveguide (2) converts a half of the broad-spectrum TM polarized light into broad-spectrum TE (transverse electric) polarized light; the broad-spectrum TE polarized light and the other half of the broad-spectrum TM polarized light, both of which are outputted from the 45-degree polarization rotation waveguide (2), enter an input end of the crossed-slit waveguide (3); the broad-spectrum TE polarized light is transmitted in the vertical slit of the crossed-slit waveguide (3), and the broad-spectrum TM polarized light is transmitted in a horizontal slit of the crossed-slit waveguide (3); the broad-spectrum TE polarized light and the other half of the broad-spectrum TM polarized light form depolarized light at an output end of the crossed-slit waveguide (3).

3. The electronically controlled depolarizer based on the crossed-slit waveguide according to claim 2, wherein the second silica buffer layer (8) comprises the horizontal slit provided in the crossed-slit waveguide (3) and a horizontal slit provided in the horizontal-slit waveguide (1).

4. The electronically controlled depolarizer based on the crossed-slit waveguide according to claim 2, wherein a transmission medium of the broad-spectrum TE polarized light in the vertical slit of the crossed-slit waveguide (3) is air; a transmission medium of the broad-spectrum TM polarized light in the horizontal slit of the crossed-slit waveguide (3) is silica.

5. The electronically controlled depolarizer based on the crossed-slit waveguide according to claim 2, wherein an optical path difference between the TE polarized light and the TM polarized light in the crossed-slit waveguide (3) is greater than a coherence length of the broad-spectrum TM polarized light which is inputted to the horizontal-slit waveguide (1).

6. The electronically controlled depolarizer based on the crossed-slit waveguide according to claim 2, wherein through electronic control, the pair of modulation electrodes (4) precisely adjust a rotation angle of the 45-degree polarization rotation waveguide (2), so that the broad-spectrum TE polarized light the and broad-spectrum TM polarized light both of which are outputted from the output end of the crossed-slit waveguide (3) are equal in energy.

* * * * *